United States Patent [19]

Smith

[11] Patent Number: 4,828,201
[45] Date of Patent: May 9, 1989

[54] APPARATUS FOR COUPLING A DRIVE MOTOR TO A LEADER BLOCK LOADING/UNLOADING MECHANISM

[75] Inventor: Jay A. Smith, Harleysville, Pa.

[73] Assignee: Laser Magnetic Storage International Company, Colorado Springs, Colo.

[21] Appl. No.: 842,487

[22] Filed: Mar. 21, 1986

[51] Int. Cl.$^4$ .................. G11B 15/66; G03B 1/56
[52] U.S. Cl. .................. 242/195; 226/92; 360/95
[58] Field of Search .......... 242/195, 197, 78.3, 242/78.8; 352/157, 158, 235; 226/91, 92; 360/93, 95, 132, 137; 464/160

[56] References Cited

U.S. PATENT DOCUMENTS

| | | | |
|---|---|---|---|
| 3,347,451 | 10/1967 | Vind | 464/160 X |
| 3,643,893 | 2/1972 | Neff | 242/195 |
| 3,659,804 | 5/1972 | Roman | 242/195 |
| 3,704,942 | 12/1972 | Tsunoda | 352/158 |
| 3,910,527 | 10/1975 | Buhler et al. | 242/186 |
| 3,949,423 | 4/1976 | Katada et al. | 360/96 |
| 3,951,357 | 4/1976 | Yamada et al. | 242/195 |
| 4,015,799 | 4/1977 | Koski et al. | 242/203 |
| 4,023,748 | 5/1977 | Burdorf et al. | 242/192 |
| 4,125,881 | 11/1978 | Eige et al. | 360/50 |
| 4,161,004 | 7/1979 | Dalziel | 360/106 |
| 4,196,873 | 4/1980 | Kudoh | 242/195 |
| 4,227,224 | 10/1980 | Umezawa et al. | 360/96.5 |
| 4,256,996 | 3/1981 | Brooks et al. | 318/7 |
| 4,305,025 | 12/1981 | Arnold | 318/327 |
| 4,323,832 | 4/1982 | Okamura | 318/341 |
| 4,334,656 | 6/1982 | Crawford et al. | 242/195 |
| 4,335,858 | 6/1982 | Cranna | 242/195 |
| 4,370,683 | 1/1983 | Greig et al. | 360/73 |
| 4,377,829 | 3/1983 | Kamimura et al. | 360/96.5 |
| 4,383,660 | 5/1983 | Richard et al. | 242/197 |
| 4,389,600 | 6/1983 | Milligan et al. | 318/6 |
| 4,398,227 | 8/1983 | Anderson | 360/71 |
| 4,399,936 | 8/1983 | Rueger | 226/92 |
| 4,399,959 | 8/1983 | Godsoe et al. | 242/195 |
| 4,407,462 | 10/1983 | Tajima et al. | 242/184 |
| 4,426,047 | 1/1984 | Richard et al. | 242/197 |
| 4,432,508 | 2/1984 | Inoue et al. | 242/195 |
| 4,434,444 | 2/1984 | Sato | 360/96.5 |
| 4,441,129 | 4/1984 | Nakao | 360/96.5 |
| 4,447,838 | 5/1984 | Kato | 360/96.5 |
| 4,448,368 | 5/1984 | Skalko | 242/186 |
| 4,452,406 | 6/1984 | Richard | 242/195 |
| 4,477,850 | 10/1984 | Ogata et al. | 360/94 |
| 4,477,851 | 10/1984 | Dalziel et al. | 360/95 |
| 4,500,965 | 2/1985 | Gray | 364/400 |
| 4,514,667 | 4/1985 | Sakmann et al. | 318/254 |
| 4,520,970 | 6/1985 | Rasmussen et al. | 242/195 |
| 4,532,563 | 7/1985 | Edakubo | 360/96.5 |
| 4,544,110 | 10/1985 | Nagel et al. | 242/67.1 R |
| 4,544,971 | 10/1985 | Komiya et al. | 360/96.5 |
| 4,555,077 | 11/1985 | Platter et al. | 242/198 |
| 4,564,875 | 1/1986 | Ihara | 360/96.6 |
| 4,608,614 | 8/1986 | Rinkleib et al. | 360/95 |
| 4,646,177 | 2/1987 | Sanford et al. | 360/95 |
| 4,704,645 | 11/1987 | Murphy et al. | 360/95 |

*Primary Examiner*—David Werner
*Attorney, Agent, or Firm*—Weiser & Stapler

[57] ABSTRACT

A take-up assembly for operating a mechanism for loading and unloading the leader block of a tape cartridge, and for receiving the web of tape which it contains for subsequent transport, stores energy for transfer to the leader block loading/unloading mechanism when it is to operate to load or unload the leader block, so that even a conventional take-up motor is made capable of supplying the increased energy needed for leader block loading/unloading.

A preferred take-up assembly includes a hub which is directly coupled to the take-up motor and which serves to receive the web of tape for direct transport, and a coupling which is nested within the hub and which receives the leader block loading/unloading mechanism. A pin depends from the coupling and into a circumferentially arranged slot formed in the hub, to connect the hub and coupling as the pin engages the ends of the slot.

10 Claims, 4 Drawing Sheets

APPARATUS FOR COUPLING A DRIVE MOTOR TO A LEADER BLOCK LOADING/UNLOADING MECHANISM

BACKGROUND OF THE INVENTION

The present invention relates generally to the storage of data on magnetic recording tape, and in particular, to the storage of data on magnetic tape in cartridge form.

In the course of developing various systems for the storage of data on magnetic recording tape, particularly off-line storage of data in the form of back-up storage, a variety of different formats have been developed. Many of these formats call for the tape to be contained in an appropriate cartridge, both to facilitate handling of the tape while in use, and to protect the tape while in storage.

Recently, IBM Corporation has announced a tape cartridge which is primarily intended for use in its Model 3480 data storage system, for the storage of relatively large quantities of data (on the order of 200 megabytes). Details regarding the construction of this type of tape cartridge (hereinafter referred to as a 3480 tape cartridge) may be had with reference to U.S. Pat. No. 4,452,406. By way of general description, the 3480 tape cartridge is comprised of a single reel containing a quantity of magnetic tape and contained in a rectangular enclosure having dimensions on the order of 4 inches in width, 5 inches in length, and 1 inch in height. The cartridge enclosure includes an aperture in one of its major faces, to receive means for rotating the reel of tape contained within the cartridge, and an aperture in one of its corners, for gaining access to the free end of the web of tape. A so-called "leader block" is connected to the free end of the tape, and is frictionally received within the open corner of the cartridge so that it is capable of being withdrawn from and replaced within the cartridge by appropriate means.

In connection with the 3480 tape cartridge, IBM Corporation has also developed equipment for receiving the tape cartridge and for properly placing the web of tape which it contains in operative association with a magnetic read/write head. Further details regarding such equipment may be had with reference to U.S. Pat. Nos. 4,432,508; 4,399,959; 4,399,936; and 4,335,858, which illustrate various different devices which have been developed by the IBM Corporation to accommodate its 3480 tape cartridge.

Unlike many of the other types of tape cartridges which have been developed for use in the off-line storage of data, the IBM 3480 tape cartridge houses only a single reel of magnetic recording tape. The leader block which is connected to the free end of the web of tape is used to introduce the web of tape to the transport apparatus (and the read/write head). To this end, the transport apparatus must be provided with appropriate means for withdrawing the leader block from its nesting within the 3480 tape cartridge, and for threading the leader block (and the web of tape) through the apparatus and past the read/write head. Of course, means must also be provided for unthreading the web of tape (and the leader block) from the apparatus, and for replacing the leader block within its nesting in the 3480 tape cartridge. In connection with such operations, there are two major considerations which bear noting.

First, special means must be provided to engage the leader block assembly, and to guide the leader block (and the tape which follows) through the transport apparatus which is to operate upon the web of tape. This requires care in withdrawing the leader block from the tape cartridge, and in guiding the web of tape from the supply reel of the tape cartridge, past the read/write head, and into engagement with the take-up reel which is traditionally provided to cooperate with the supply reel in transporting the web of tape through the apparatus and past the read/write head. This necessitates the development of an appropriate path for threading the leader block through the apparatus, as well as means which have sufficient driving forces to withdraw the leader block from its normally seated position within the tape cartridge, and to replace the leader block within this normally seated position after the tape cartridge has been used. To meet these needs, as well as other design requirements regarding data density and performance characteristics, those devices described in the above-identified U.S. Patents each make use of a loading mechanism which is essentially separate from the remainder of the apparatus which is used to operate upon the magnetic recording tape. In each case, a track or groove is provided for guiding the leader block through the desired tape path and to the take-up reel, under the influence of a dedicated driving means which is separate from the various components comprising the tape transport. Although several different mechanisms are described, in each case a separate motor and track/groove drive is provided to achieve proper interfacing of the web of tape with the apparatus.

Second, as with any magnetic tape recording apparatus, care must be taken to develop a proper tape path between the supply and take-up reels, and across the read/write head, to assure proper registration of the tape with the read/write head. The primary consideration in this regard is one of length, since the tape path must generally be long enough to accommodate distortion of the tape as the web of tape is drawn through the apparatus, as a result of mechanical irregularities in the apparatus. To this end, those devices described in the above-identified patents each provide a tape path of significant length, to account for such potential irregularities. A secondary consideration is that care must be taken to avoid undesirable contact between the oxide coating provided on the web of magnetic recording tape, and components of the apparatus other than the read/write head, such as bearings and idler rollers. When the IBM 3480 tape cartridge is used as intended in the various devices described in the above-identified patents, the oxide coating (formed on the inner most face of the tape on the supply reel) normally faces toward the interior of the transport apparatus due to its orientation. As a result of this placement, as the tape is threaded through the transport apparatus the potential exists for the oxide coating to be drawn across various of the guiding structures associated with the apparatus. Since contact with such structures can compromise the useful life of the tape cartridge, and give rise to a potential for memory loss in the event that portions of the oxide coating become damaged, special care is taken to avoid contact between the oxide coating and those guiding structures which the oxide coating could potentially contact. For example, air-bearings are provided on either side of the read/write head to avoid contact between the bearings and the web of tape which passes across them.

As a result of these and other design considerations, those devices which have been developed to operate upon IBM 3480 tape cartridges have generally been large, cumbersome and expensive. While this can be justified in connection with relatively large, mainframe applications, such design constraints have significantly limited, if not totally precluded use of the 3480 tape cartridge in connection with relatively low cost, mini-computer or microcomputer applications.

Yet another consideration which has inhibited use of the 3480 tape cartridge in mini/micro-computer applications is one of space. It is generally impractical, and therefore undesirable, to necessitate the purchase of an apparatus for off-line, back-up storage or the like which is significantly larger than the primary equipment which the apparatus is to support. In fact, due to the prevalent use of 5¼ inch magnetic recording (floppy) discs in connection with such applications, a de facto standard has come about for any form of storage equipment (floppy disc, hard disc, cartridge, etc.) which is to replace or relate to such conventional storage means. The recognized "form factor" or "footprint" of a standard 5¼ inch magnetic recording disc calls for a container or housing having dimensions on the order of 5¾ inches in width, 8 inches in depth and 3¼ inches in height. Those devices described in the above-identified patents are not adaptable to such applications.

Accordingly, limitations of cost and size significantly limited the ability to use the IBM 3480 tape cartridge in mini/micro-computer applications. To extend the usefulness of the 3480 tape cartridge to mini/micro-computer applications, co-filed and commonly owned U.S. patent application Ser. Nos. 842,446 and 842,450, in the name of Jay Smith and entitled "Apparatus for Loading and Unloading the Leader Block of a Tape Cartridge", the subject matter of which are incorporated by reference as if fully set forth herein, describe a simplified means for loading and unloading the leader block of a 3480 tape cartridge, making use of a loading/unloading mechanism which is directly associated with the take-up reel of the apparatus rather than a separate mechanism. To this end, the take-up reel of the apparatus is provided with a linkage which extends from the periphery of the take-up reel, and which has a pin for engaging the leader block of the tape cartridge. The pin of the linkage is caused to proceed along a specified path, following a camming surface under the influence of an over-center spring, to achieve effective tranfer of the leader block from the tape cartridge, through its specified tape path, to the take-up reel, and vice versa. Consequently, leader block loading and unloading is accomplished without requiring the use of an additional drive mechanism for this purpose, significantly reducing the number of components of the apparatus, and enabling the apparatus to be reduced to a size which can be fit within a standard 5¼ inch footprint or form factor.

However, the energy required to withdraw the leader block from the tape cartridge, as well as to later replace the leader block within the tape cartridge, is significantly greater then the energy required to transport tape within the apparatus. Consequently, it has been found that conventional take-up motors are generally insufficient to also operate the leader block loading-/unloading mechanism. Increasing the capabilities of the take-up motor would overcome this problem, but only at the expense of increased costs, size and/or input power requirements.

SUMMARY OF THE INVENTION

It is therefore a primary object of the present invention to provide an apparatus for receiving and operating upon an IBM 3480 tape cartridge, which is sufficiently compact to fit within a standard 5¼ inch footprint or form factor without compromising performance of the tape cartridge or the conventional components of the apparatus.

It is also an object of the present invention to provide a take-up assembly for both receiving and operating upon the web of tape contained in the tape cartridge, using a single motor drive.

It is also an object of the present invention to provide a take-up assembly for both receiving and operating upon the web of tape, using a conventional take-up motor.

It is also an object of the present invention to provide such means in an apparatus which is simple and reliable in operation, and which is cost effective even in connection with mini/micro-computer applications.

These and other objects are achieved according to the present invention by providing a take-up assembly which is capable of both operating a mechanism for loading and unloading the leader block of a 3480 tape cartridge, and receiving the web of tape for subsequent transport, by providing sufficient energy for transfer to the leader block loading/unloading mechanism when it is to operate to load or unload the leader block. As a consequence of this, even a conventional take-up motor is made capable of supplying the increased energy needed for leader block loading/unloading, eliminating the need to increase either the capacity of the motor, or the supplied currents.

A preferred take-up assembly according to the present invention includes a hub which is directly coupled to the take-up motor and which serves to receive the web of tape for direct transport, and a coupling which is nested within the hub and which receives the leader block loading/unloading mechanism. A pin depends from the coupling and into a circumferentially arranged slot formed in the hub, to connect the hub and coupling as the pin engages the ends of the slot. The length of the slot defines an angle which, in combination with the moment arm defined between the axis of the take-up assembly and the leader block loading/unloading mechanism, develops a torque output which is sufficent to withdraw or replace the leader block, as desired, making use of an otherwise conventional take-up motor (one which is ordinarily only required to transport tape).

For further detail regarding the improvements of the present invention, reference is made to the following detailed description, taken in conjunction with the following illustrations.

BRIEF DESCRIPTION OF THE DRAWINGS

In the several views provided, like reference numerals denote similar structure.

DETAILED DESCRIPTION OF A PREFERRED EMBODIMENT

Figure 1:
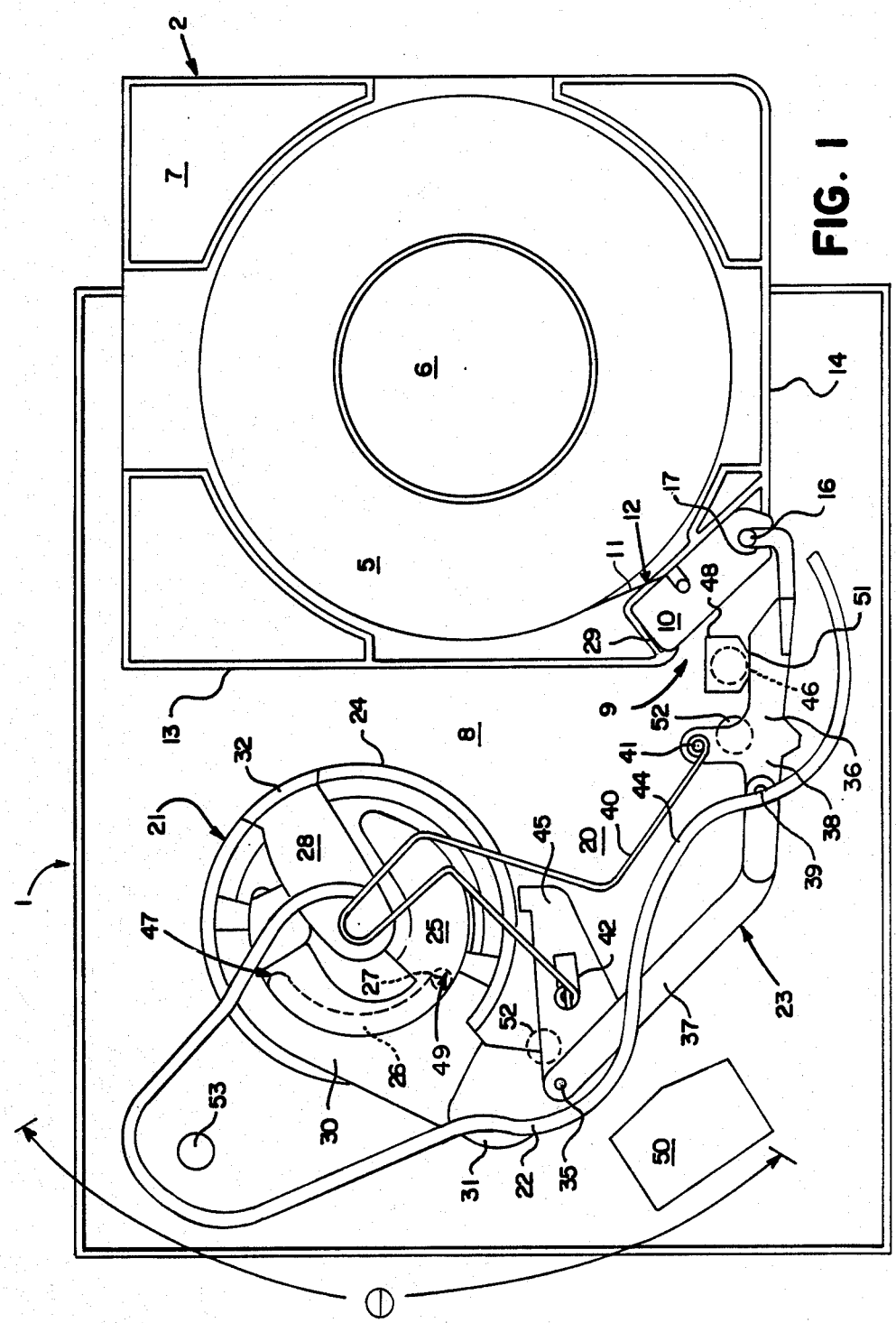
FIG. 1 is a top plan view of an apparatus for operating upon a tape cartridge in accordance with the present invention, showing the tape cartridge as it is initially received within the apparatus.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
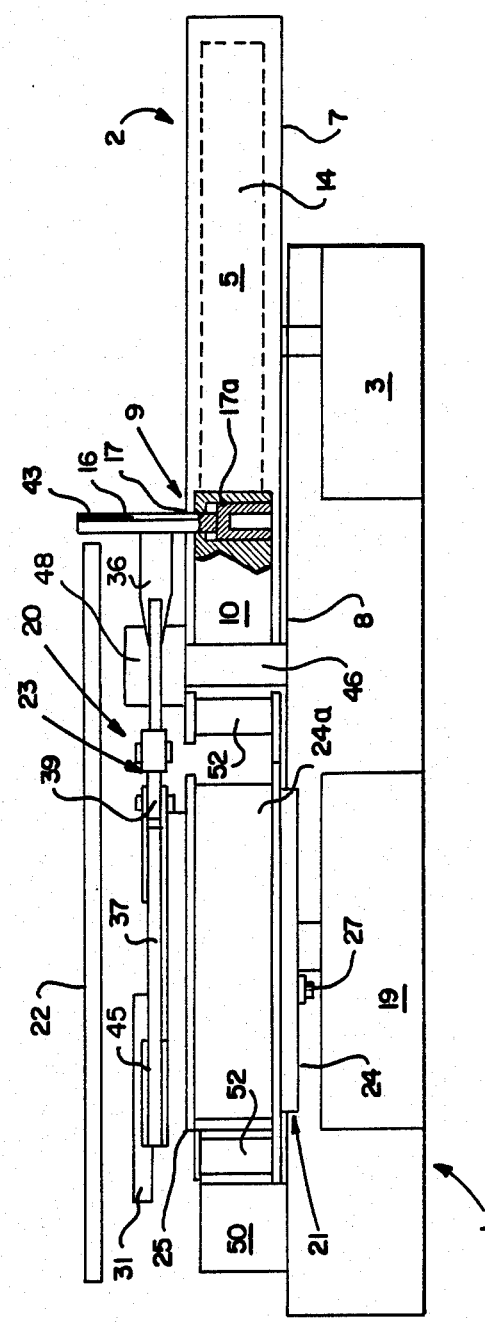
FIG. 2 is a partially sectioned, side elevation view of the apparatus shown in FIG. 1.

FIGS. 1 and 2 show a transport apparatus 1 for receiving and operating upon an IBM 3480 tape cartridge 2 in accordance with the present invention. To be noted is that the apparatus 1 is sufficiently compact to be received within the confines of a standard 5¼ inch form factor or footprint.

The tape cartridge 2 generally comprises a quantity of tape 5 wound upon a supply reel 6 and contained within a housing 7. Suitable means (preferably a geared, magnetic coupling) are provided for placing the supply reel 6 in operative association with a supply motor 3 positioned beneath the surface 8 of the transport apparatus 1. A corner 9 of the housing 7 is open, and receives a leader block 10, which is used to securely engage the free end 11 of the web of tape 5 in the manner shown. As produced by the manufacturer, the inwardly facing surface 12 of the web of tape 5 is provided with the requisite oxide coating.

The web of tape 5 is preferably received within the transport apparatus 1 so that the leader block 10 is remote from the operative features of the transport apparatus 1, to improve the available tape path, and so that the surface 12 of the web of tape 5 faces generally outwardly as the web of tape 5 is withdrawn from the tape cartridge 2 and introduced into the transport apparatus 1, to avoid the potential for contact with such operative features. To this end, the tape cartridge 2 is received within the transport apparatus 1 along a side edge 13, rather than being received along its rear edge 14, in the usual manner. This essentially rotates the tape cartridge 2 through an angle of 90°, so that the leader block 10 is positioned along the left side of the transport apparatus 1, as viewed from its front, rather than its usual placement along the right side of the transport apparatus 1. Means for receiving the tape cartridge 2 in this orientation, and for readying the tape cartridge 2 and the leader block 10 for further use, are described with reference to a co-filed and commonly owned U.S. patent application Ser. No. 842,449, in the name of Arnold Schonfeld and Robert Lane and entitled "Apparatus For Loading and Unloading a Tape Cartridge", the subject matter of which is incorporated by reference as if fully set forth herein.

Once received within the transport apparatus 1, the tape cartridge 2 is then readied for further operation as follows. First, the supply reel 6 is operatively connected to the supply motor 3 which is positioned beneath the surface 8 of the transport apparatus 1, so as to achieve desired rotation of the supply reel 6 in accordance with the selected mode of operation of the transport apparatus 1. Second, a configured pin 16 is brought into engagement with the slot 17 (and counterbore 17a) which is conventionally provided in the leader block 10 of the tape cartridge 2, so as to operatively connect the leader block 10 with the leader block loading/unloading mechanism 20, and ready the leader block 10 for loading into the transport apparatus 1 as will be described more fully below.

The leader block loading/unloading mechanism 20 is generally comprised of three major components including a configured take-up reel 21, a contoured camming surface 22, and an articulating engagement mechanism 23.

Figure 3:
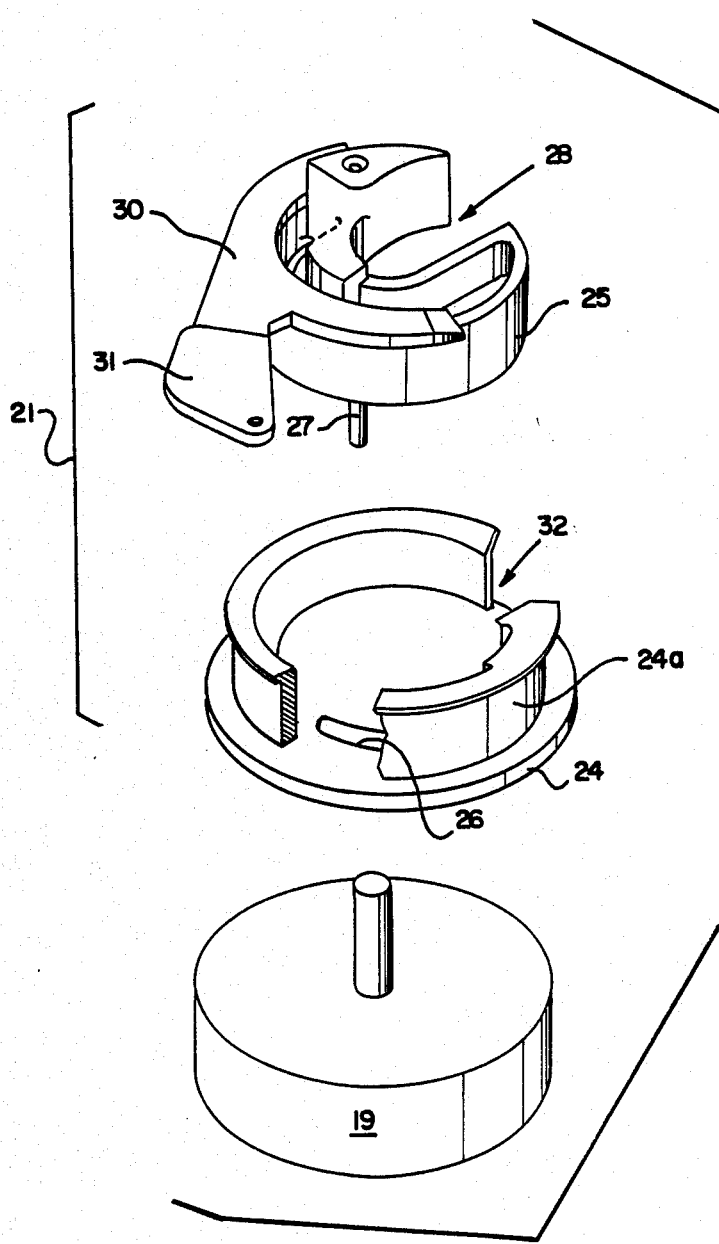
FIG. 3 is an exploded, isometric view of the take-up reel of the apparatus shown in FIG. 1.

The take-up reel 21 is operatively connected to a take-up motor 19 by a concentric hub 24 and coupling 25, as is best illustrated with reference to FIG. 3. The hub 24 is attached to the take-up motor 19, and includes a concentric wall 24a which serves to receive the web of tape 5. The coupling 25 is nested within the hub 24, and is operatively connected to the hub 24 by a peg 27 which depends from the coupling 25 and into a concentrically arranged slot 26 formed in the hub 24.

The coupling 25 is additionally provided with a cavity 28 which is correspondingly configured to the leader block 10 of the tape cartridge 2, and the wall of the hub 24 is provided with a corresponding slot 32 which permits communication with the cavity 28 of the coupling 25 upon proper alignment of the hub 24 and coupling 25 as will become apparent from the description which follows. The cavity 28 is preferably configured to securely receive the leader block 10 so that the rear face 29 of the leader block 10 fills the slot 32 and co-terminates with the periphery of the hub wall 24a, essentially completing the periphery of the hub 24 so as to properly receive the web of tape 5. The upper surface 30 of the coupling 25 is provided with a flange 31 which, as a secondary function serves to retain the web of tape 5 to the take-up reel 21, and as a primary function serves to receive the articulating engagement mechanism 23, at the pivot 35.

The articulating engagement mechanism 23 is generally comprised of two arms 36, 37. The primary arm 36 terminates at the pin 16 which is used to engage the slot 17 of the leader block 10. The opposite end 38 of the primary arm 36 is connected to the secondary arm 37, at a pivot 39. Respective articulation of the arms 36, 37 is regulated by a spring 40 which is connected between an attachment point 41 fixed on the primary arm 36 and an attachment point 42 fixed on a flange 45 attached to and projecting from the secondary arm 37, toward the take-up reel 21. The spring 40 is pivotally connected between the arms 36, 37 so that the spring is caused to proceed through an "over-center" position wherein in certain orientations, compression of the spring 40 will cause the arm 36 to rotate in a clockwise direction with respect to the arm 37, while in other orientations, compression of the spring 40 will cause the arm 36 to rotate in a counter-clockwise direction with respect to the arm 37. Such rotation is responsive to the position of the pivot 39 with respect to the line of forces developed between the attachment points 41, 42.

The contoured camming surface 22 is positioned above the flange 31 of the take-up reel 21 so that the take-up reel 21 and the articulating engagement mechanism 23 are capable of movement beneath the contoured camming surface 22, but so that the upper end 43 of the pin 16 is capable of following the face 44 of the contoured camming surface 22 to achieve loading and unloading of the leader block 10.

The loading/unloading mechanism 20 generally serves to transfer the leader block 10 of the tape cartridge 2 from its seated position within the corner 9 of the housing 7, past a read/write head 50, and to the cavity 28 formed in the take-up reel 21, so that the web of tape 5 is ready for transport between the supply reel 6 and the take-up reel 21 under the influence of the motor 3, 19. However, as previously described, because of the manner in which the leader block 10 is seated within the tape cartridge 2, the amount of energy (torque acting through an arc of rotation) required to withdraw the leader block 10 from the housing 7 is significantly greater than the amount of energy normally required for tape transport. In accordance with the present invention, sufficient energy is provided for removal of the leader block 10, making use of a conventional take-up motor 19, by causing the hub 24, and therefore the slot 26, to rotate with an appropriate torque through a defined angle ($\theta$) until such time as the peg 27 engages the end 49 of the slot 26, directly coupling the motor 19 to the coupling 25. Thus, the amount of energy produced in this fashion relates to the torque applied through the angle ($\theta$) defined by the slot 26.

Accordingly, to unload the leader block 10 from the tape cartridge 2, the hub 24 is moved in a clockwise direction from a first position in which the end 47 of the slot 26 engages the pin 27, to a second position in which the end 49 of the slot 26 engages the pin 27, under the influence of the take-up motor 19 (which is preferably microprocessor controlled to accomplish this function). The energy resulting from such movement, which is stored in angular velocity of the mass of the take-up motor 19 and the hub 24 during motion of the pin 27 in the slot 26, and transferred via the impact of the pin 27 with the end 49 of the slot 26 to the articulating engagement mechanism 23, has been found to be sufficient to cause a retraction of the articulating engagement mechanism 23 which is sufficient to snap the leader block 10 from its nesting within the housing 7. Engagement between the primary arm 36 and a pivot block 48, at the interface 51, has been found to be of particular importance in directing the forces applied to the leader block 10 so that the leader block 10 is reliably withdrawn from the housing 7 in the course of the foregoing operations.

Further retraction of the articulating engagement mechanism 23 responsive to continued clockwise rotation of the take-up reel 21 causes the pin 16 (with the leader block 10 attached) to progress generally to the left, bringing the upper end 43 of the pin 16 into engagement with the face 44 of the contoured camming surface 22. Upon continued clockwise rotation of the take-up reel 21, the spring 40 serves to urge the pin 16 into the face 44 of the contoured camming surface 22, causing the pin 16 to progress along the defined contour. This, in turn, draws the leader block 10, and the web of tape 5, around a first idler roller 46, past a pair of bearings 52, and around yet another idler roller 53, for eventual delivery to the take-up reel 21.

Further clockwise rotation of the take-up reel 21 causes the leader block 10 to enter the cavity 28. To enable the leader block 10 to enter the cavity 28, two considerations arise. First, the leader block 10 must arrive in general alignment with the cavity 28 as the take-up reel 21 is rotated. Such dynamic placement of the leader block 10 is accommodated by the configuration of the articulating engagement mechanism 23. Second, the slot 32 in the hub 24 must be aligned with the cavity 28 in the coupling 25 for the leader block to enter the cavity 28. This is accomplished by properly placing the slot 32 in relation to the slot 26 of the hub 24, so that the slot 32 and the cavity 28 are brought in alignment when the peg 27 contacts the end 49 of the slot 26 as previously described.

As the leader block 10 enters the cavity 28, the line of forces of the over-center spring 40 as defined by the attachment points 41, 42 crosses the pivot 39. As a consequence of this, the spring 40 now serves to urge the leader block 10 inwardly toward the center of the take-up reel 21, assuring that the leader block 10 becomes fully and firmly seated within the cavity 28. As a result, the periphery of the hub 24 becomes completed by the surface 29 of the leader block 10, permitting the web of tape 5 to be wound around the take-up reel 21 for subsequent transport between the supply reel 6 and the take-up reel 21 in otherwise conventional fashion. To be noted is that this results in a positive engagement of the web of tape 5 by a hub 24 which is rigidly coupled to the take-up motor 19, so as to assure that the web of tape 5 is properly transported in accordance with generally recognized principles.

Of course, the web of tape 5 must be transported between the supply reel 6 and the take-up reel 21 in a manner which assures that the surface 12 of the web of tape 5 is in proper contact with the read/write head 50. In delivering the leader block 10 to the take-up reel 21 as previously described, it is generally necessary to provide a significant space between the read/write head 50 and the plane of the bearings 52, to enable passage of the leader block 10. Accordingly, to develop proper contact with the read/write head 50 it becomes necessary to reorient the bearings 52 so as to develop a proper tape wrap about the read/write head 50, in accordance with recognized practices. Further details regarding such structure may be had with reference to a co-filed and commonly owned U.S. patent application Ser. No. 842,448, in the name of Daniel Sachuk and entitled "Retractable Tape Guide", the subject matter of which is incorporated by reference as if fully set forth herein.

Having properly threaded the web of tape 5 through the transport apparatus 1, and having placed the oxide surface 12 of the web of tape 5 in appropriate contact with the read/write head 50, desired transfers of data may then take place in otherwise conventional manner. This proceeds until such time as the transfer of data has been completed and the tape cartridge 2 is to be unloaded from the transport apparatus 1.

Figure 4:
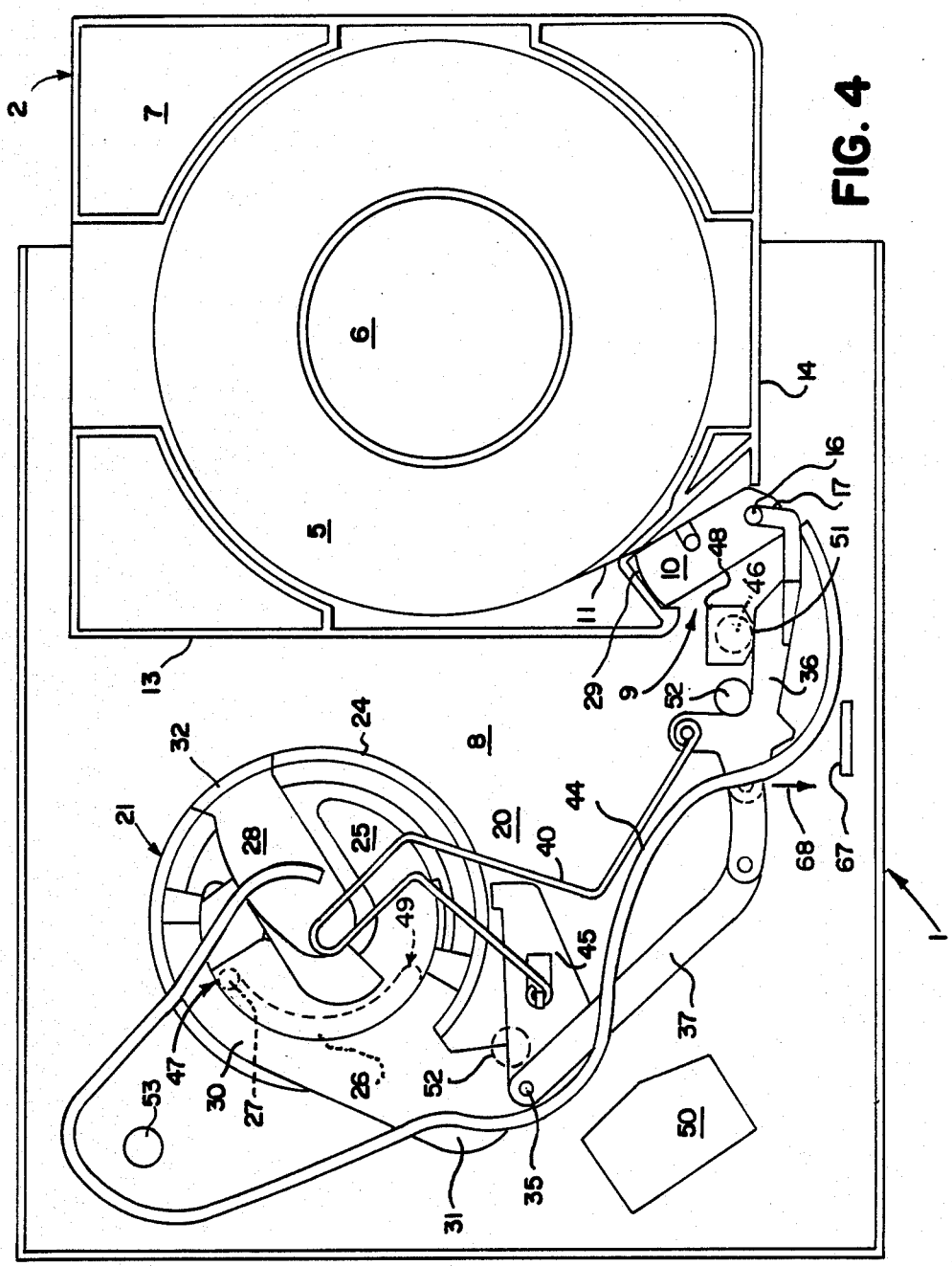
FIG. 4 is a top plan view similar to FIG. 1, showing operation of the apparatus as the leader block is returned to the tape cartridge.

In essence, this is accomplished by reversing the above described steps. The supply motor 3 is rotated in a clockwise direction until such time as the web of tape 5 is fully unwound from the take-up reel 21. Continued clockwise rotation of the supply motor 3 serves to pull the leader block 10 from the cavity 28, and to draw the leader block 10 along the face 44 of the camming surface 22, until such time as the web of tape 5 and the end 29 of the leader block 10 are returned to the housing 7 of the tape cartridge 2, and the end of the leader block 10 which is engaged by the pin 16 is in a position just outside of its nesting in the corner 9 of the tape cartridge 2, with reference to FIG. 4.

Since the energy required for replacement of the leader block 10 will again exceed the normal capabilities of the take-up motor 19, further action upon the reels 6, 21 is needed to force the leader block 10 into its nesting in the corner 9 of the tape cartridge 2. The energy required to fully snap the leader block 10 into the housing 7 is again primarily supplied by the hub 24 which connects the take-up reel 21 to the drive motor 19. As previously described in connection with unloading of the leader block 10, the kinetic energy needed to return the leader block 10 to its nesting is again capable of being developed by rotating the hub 24 through the specified angle (θ) so as to cause the slot 26 of the hub 24 to slip with respect to the peg 27 of the coupling 25, this time from the end 49 to the end 47. A reaction wall 67 is provided to limit movement of the articulating engagement mechanism 23 (in the direction of arrow 68), to transmit the forces developed under the influence of the take-up motor 19 in an appropriate direction to snap the leader block 10 back into the housing 7. After such steps have been taken to seat the leader block 10 in the housing 7, an appropriate torque may be applied to the motor 19, if desired, to test the seating of the leader block 10 and make sure that it has been fully snapped back into the housing 7.

It will therefore be seen that the foregoing apparatus serves well to satisfy each of the objectives previously set forth. The means used to load and unload the leader block 10 are directly associated with the take-up reel 21, and are capable of accomplishing leader block loading and unloading, as well as tape transport, using an otherwise conventional take-up motor 19.

It is also to be understood that the foregoing is capable of variation without departing from the spirit and scope of the present invention. For example, the configuration of the hub 24 and coupling 25 may be varied, as may the means which are used to interconnect such structures. To be noted is that in the foregoing description, a slot 26 is formed in the hub 24 and a pin 27 is provided in the coupling 25. It is equally possible for these structures to be reversed, if desired. The angle (θ) developed in accordance with the present invention is also capable of variation to provide the torques required for proper operation of the apparatus as previously described. Moreover, the interactive coupling of the present invention will find applicability to other tape transports, apart from the transport previously described, or even to other devices which exhibit similar requirements.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. In a transport apparatus for receiving and operating upon a tape cartridge including a web of tape disposed on a supply reel and having a free end engaged by a leader block nested within said tape cartridge, and including a take-up reel for transporting said web of tape between said supply reel and said take-up reel responsive to a motor, wherein the energy required to withdraw the leader block from said nesting exceeds the energy required to transport said web of tape and the capacity of said motor:
   means associated with said take-up reel for engaging the leader block of said tape cartridge and for delivering said leader block from the nesting of said tape cartridge to said take-up reel; and
   means associated with said take-up reel for transferring stored energy to said leader block engaging means to enable said leader block to be withdrawn from said nesting, comprising a hub connected to said motor and including a cylindrical wall for receiving said web of tape, a coupling nested within said hub and including a cavity for receiving said leader block, a flange for receiving said leader block engaging means, and means for causing said hub and coupling to rotate with respect to one another for a defined arc upon rotation of said hub by said motor.

2. The apparatus of claim 1 wherein said means for causing said hub and coupling to rotate with respect to one another is a slot formed in said hub, and a peg depending from said coupling and slidingly engaging said slot.

3. The apparatus of claim 2 wherein said arc is defined by the length of said slot.

4. The apparatus of claim 3 wherein said defined arc is selected according to the energy required to withdraw the leader block from said nesting.

5. The apparatus of claim 1 wherein a reaction point is provided for directing forces applied to said leader block when said leader block is to be withdrawn from said tape cartridge.

6. The apparatus of claim 1 wherein the energy required to replace the leader block within said nesting exceeds the energy required to transport said web of tape and the capacity of said motor and including means associated with said take-up reel for transferring stored energy to said leader block engaging means to also enable said leader block to be replaced in said nesting.

7. The apparatus of claim 6 wherein a reaction point is provided for directing the forces applied to said leader block when said leader block is to be replaced in said tape cartridge.

8. In a transport apparatus for receiving and operating upon a tape cartridge including a web of tape disposed on a supply reel and having a free end engaged by a leader block nested within said tape cartridge, and having a hub for receiving said leader block and said web of tape, and for transporting said web of tape responsive to a motor:
   a coupling for operatively connecting said hub and said motor to a means for engaging said leader block and for withdrawing said leader block from said tape cartridge for delivery to said hub, wherein the energy required to withdraw the leader block from said nesting exceeds the energy required to transport said web of tape and the capacity of said motor, said coupling including a peg depending from said coupling and slidingly engaging a slot in said hub so that said peg and said slot are capable of sliding with respect to one another to transferring stored energy to said leader block engaging means to enable said leader block to be withdrawn from said nesting.

9. The apparatus of claim 8 wherein said slot is elongated for an arc defined according to the energy required to withdraw the leader block from said nesting.

10. The apparatus of claim 8 wherein the energy required to replace the leader block within said nesting exceeds the energy required to transport said web of tape and the capacity of said motor, and wherein said peg and said slot are capable of sliding with respect to one another to transferring stored energy to said leader block engaging means to enable said leader block to be replaced within said nesting.

* * * * *